United States Patent [19]

Butwell

[11] 4,079,117
[45] Mar. 14, 1978

[54] PROCESS FOR ACID GAS REMOVAL
[75] Inventor: Kenneth Francis Butwell, Newburgh, N.Y.
[73] Assignee: Union Carbide Corporation, New York, N.Y.
[21] Appl. No.: 603,287
[22] Filed: Aug. 11, 1975
[51] Int. Cl.$^2$ ............................................. B01D 53/34
[52] U.S. Cl. .................................... 423/228; 423/229
[58] Field of Search ................................ 423/226–229

[56] References Cited
U.S. PATENT DOCUMENTS

| | | | |
|---|---|---|---|
| 2,157,879 | 5/1939 | Zublin | 423/228 X |
| 2,368,595 | 1/1945 | Johnson | 423/228 X |
| 2,886,405 | 5/1959 | Benson et al. | 423/228 X |
| 3,690,816 | 9/1972 | Alleman | 423/228 |
| 3,864,449 | 2/1975 | Homberg et al. | 423/228 |
| 3,897,227 | 7/1975 | Giammarco et al. | 423/229 |

FOREIGN PATENT DOCUMENTS 1,244,176  8/1971  United Kingdom ................. 423/229

OTHER PUBLICATIONS

Brennan, "Amine Treating of Sour Gas: Good Riddanci to H$_2$S", Chemical Engineering, vol. 69, No. 22, Oct. 29, 1962, pp. 94–96.
Willmott et al, "Performance of a Gilbotol Purification Plant at Louisiana, Mo.", Bureau of Mines Report of Investigations 5196, Feb. 1956, 18pps, pp. 13–15.

Primary Examiner—Earl C. Thomas
Attorney, Agent, or Firm—Dominic J. Terminello

[57] ABSTRACT

A continuous process for acid gas removal such as the removal of carbon dioxide, from a feed mixture of process gas and acid gas which comprises introducing the gaseous feed mixture to an absorption zone at an absorption zone inlet temperature in the range of about 35° C. to 150° C., treating the gaseous feed mixture in the absorption zone with an aqueous solution of alkanolamine under specified conditions, the absorption zone inlet temperature for the solution being in the range of about 30° C. to about 75° C., passing the aqueous solution of alkanolamine having acid gas absorbed therein to a stripping zone at an inlet temperature essentially the same as the absorption zone outlet temperature for said solution, removing solution from the bottom of the stripping zone at a bottoms outlet temperature in the range of about 100° C. to about 150° C., and wherein the conditions in the absorption zone are selected so as to provide an absorption zone outlet temperature for the aqueous alkanolamine solution having acid gas absorbed therein in a range the lowest point of which is no lower than 22° C. less than the bottom outlet temperature of the stripping zone and the highest point of which is about 150° C.

7 Claims, 1 Drawing Figure

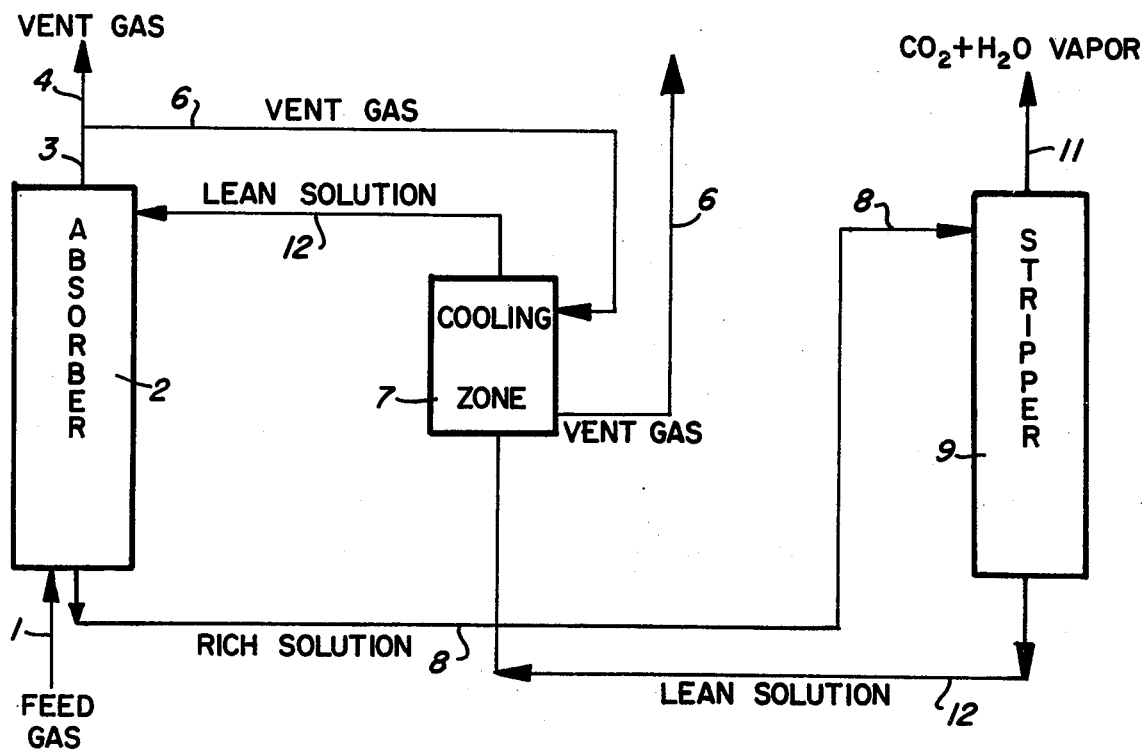

PROCESS FOR ACID GAS REMOVAL

FIELD OF THE INVENTION

This invention relates to a process for acid gas removal and, more particularly, to the removal of carbon dioxide and/or hydrogen sulfide from various process gases.

DESCRIPTION OF THE PRIOR ART

The removal of acid gases by counter-current absorption with alkanolamines has been an integral part of industrial technology for over forty years. The system practiced today, except for the introduction of certain unique corrosion inhibitors, has changed very little from its inception, i.e. a system comprising an absorber and a stripper with a lean-rich heat exchanger in between.

While it is true that the above referred to corrosion inhibitors have permitted the upgrading of the conditions used in the basic system the industry has continued to seek further optimization in terms of lower energy requirements, lower capital expenditure, i.e., reduction in the number of pieces and size of required apparatus, and reduced solution flowrates while maintaining high throughput.

SUMMARY OF THE INVENTION

An object of this invention, therefore, is to provide an improvement in a process for acid gas removal whereby the need for heating and cooling from external sources is minimized; reduced equipment requirements are achieved particularly by elimination of the ubiquitous lean-rich heat exchanger, which has become a fixture between absorber and still in the basic system and whose raison d'etre is to heat up the rich solvent prior to its introduction into the still; and by reducing solution flowrates.

Other objects and advantages will become apparent hereinafter.

According to the present invention a high throughput of feed gas is accomplished using minimal heat and apparatus by a continuous process for acid gas removal comprising the following steps:

(a) introducing into an absorption zone a mixture of process gas and acid gas comprising a process gas selected from the group consisting of a hydrocarbon, a mixture of hydrocarbons, synthesis gas, and a mixture of nitrogen and hydrogen, and about 5 to about 60 percent by volume of an acid gas selected from the group consisting of carbon dioxide, hydrogen sulfide, and mixtures of said acid gases, wherein percent by volume is based on the total volume of the mixture of process gas and acid gas introduced into the absorption zone,
at an absorption zone inlet temperature for the mixture of process gas and acid gas in the range of about 35° C. to about 150° C.;

(b) counter-currently contacting in the absorption zone the mixture of process gas and acid gas referred to in step (a) with an alkanolamine having 1 to 3 alkanol radicals, each alkanol radical having 2 or 3 carbon atoms, and water, sufficient water being present to provide a molality in the range of about 3 to about 130, the determination of said molality being made on the basis of alkanolamine as solute and water as solvent wherein the pressure in the absorption zone is in the range of about 100 psia to about 1500 psia, the alkanolamine and water are in solution prior to contact and the absorption zone inlet temperature for said solution is in the range of about 30° C. to about 75° C.,
the acid gas is absorbed into the aqueous alkanolamine solution in an amount of about 0.1 mole to about 1.0 mole of acid gas per mol of alkanolamine, and
the amount of acid gas, the absorption zone inlet temperature of the mixture of process gas and acid gas, the molality, and the amount of absorption are selected from the ranges set forth above to provide an absorption zone outlet temperature for the aqueous alkanolamine solution with the acid gas absorbed therein in a range the lowest point of which is no lower than 22° C. less than the bottoms outlet temperature of the stripping zone referred to in step (g) and the highest point of which is about 150° C.;

(c) removing the process gas overhead from the absorption zone;

(d) removing the aqueous alkanolamine solution with the acid gas absorbed therein from the bottom of the absorption zone;

(e) introducing the solution from step (d) into a stripping zone at an inlet temperature essentially the same as the absorption zone outlet temperature for said solution;

(f) separating a mixture of acid gas and a minor proportion of water from the solution referred to in step (e), the separated water being in the form of vapor, and removing said mixture overhead from the stripping zone;

(g) removing the balance of the solution referred to in step (f) from the bottom of the stripping zone at a bottoms outlet temperature in the range of about 100° C. to about 150° C.;

(h) passing the solution from step (g) into a cooling zone wherein the temperature of the solution is reduced to a temperature in the range of about 30° C. to about 75° C.; and (i) recycling the solution of step (h) to the absorption zone.

BRIEF DESCRIPTION OF THE DRAWING

The sole FIGURE is a schematic flow diagram of an illustrative embodiment of the present invention.

DESCRIPTION OF THE PREFERRED EMBODIMENT

As noted, the feed gas is a mixture of process gas and acid gas, the process gas being selected from the group consisting of a hydrocarbon, a mixture of hydrocarbons, synthesis gas, and a mixture of nitrogen and hydrogen. Examples of hydrocarbons that are processed in the systems are ethane, methane which may be in the form of natural gas or substitute or synthetic natural gas (SNG), ethylene, ethane, propylene, propane, mixtures of such hydrocarbons, and the prepurified effluents from the cracking of naphtha or crude oil or from coal gasification. The synthesis gas refers to mixtures of hydrogen and carbon monoxide in varying proportions generally in the range of about 60 to about 80 percent by volume hydrogen and about 0.1 to about 20 percent by volume carbon monoxide with the balance, if any, being carbon dioxide. The percent is based on the total volume of the synthesis gas. Typical mixtures are $H_2$ 77.7%, CO 0.3%, and $CO_2$ 19.2% and $H_2$ 70%, CO 15%, and $CO_2$ 15%. The mixture of nitrogen and hydrogen is used in the manufacture of ammonia. Generally, the mixture contains about 20 percent by volume nitrogen and about 60 percent by volume hydrogen based on the total volume of the mixture of nitrogen and hydrogen.

The throughput of feed gas in the subject process can be about 5900 m³h (cubic meters per hour) to about 236,000 m³h and is usually about 47,200 m³h to about 147,500 mhu 3h.

The feed gas also contains an acid gas selected from the group consisting of carbon dioxide, hydrogen sulfide, and mixtures thereof in amounts of about 5 to about 60 percent by volume based on the total volume of the feed gas. (See Cag in formula below). The "total volume of the feed gas" is inclusive of process gas as dfined and acid gas as defined, but exclusive of water vapor and the impurities discussed below. The amount of acid gas usually contained in the feed gas is in the range of about 15 to about 30 percent by volume. The acid gas mixtures contain about 1 to about 49 percent by volume of each acid gas, the volume percent being based on the total volume of the acid gas mixture, but even ppm (parts per million) amounts can be handled by the process. Where the ratio by volume of $CO_2$ to $H_2S$ in the process gas is greater than 3:1, the process gas may be sent first to a system for selective absorption of hydrogen sulfide if it is desired to use the hydrogen sulfide in the production of elemental sulfur.

Water can be and is usually present in mixture with all of the process gas components in the form of water vapor or droplets in amounts running from 0 to saturated and is preferably saturated. (See Cw) Saturation minimizes water evaporation in the bottom of the absorption zone. An anhydrous feed gas may be used but is very rare. The water referred to here is not considered in the determination of molality unless and until it goes into solution with the alkanolamine.

The impurities as defined herein are represented by (a) any gas not defined above as a process gas, acid gas, or water vapor, and (b) solid particles or liquid droplets (exclusive of water droplets) in the feed gas. They can be present in amounts of up to about 3 weight percent based on the total weight of the feed gas and are preferably present in amounts no greater than about 1 weight percent and, in many cases, lower than 0.01 percent. Examples of the gaseous impurities are sulfur dioxide, carbonyl sulfide, and carbon disulfide. Examples of the solid or liquid impurities are iron sulfide, iron oxide, high molecular weight hydrocarbons, and polymers. Any olefins having more than one double bond, triple bond hydrocarbons, and as a general rule, any material that will polymerize or react in situ is an undesirable impurity.

The absorbent is a solution of an alkanolamine having 1 to 3 alkanol radicals, each alkanol radical having 1 to 3 carbon atoms, and water. Examples of the alkanolamines are monoethanolamine (MEA), diethanolamine (DEA), and triethanolamine (TEA), MEA being the absorbent of choice. Other suitable alkanolamines are diisopropanolamine, monoisopropanolamine, monopropanolamine, dipropanolamine, tripropanolamine, and triisopropanolamine. Although mixtures of alkanolamines can be used, they are not preferred.

There is enough water in the solution or added to the system to provide a molality in the range of about 3 to about 130. The determination of molality is made on the basis of alkanolamine as solute and water as solvent wherein the molality of the solution is equal to the number of moles of solute (alkanolamine) dissolved in 1000 grams of solvent (water). The molality in subject process concerns the lean alkanolamine solution which is used to contact the process gas in the absorption zone. Other water in the system is not considered in the determination.

The aqueous MEA solution introduced into the system is generally from about 30 percent to about 70 percent by weight MEA based on the weight of the solution. Again, this solution should either provide the correct molality for the process or additional water must be added to the system to do so. Where DEA is used the broad range in initial solution is about 50 percent to about 90 percent by weight, and where TEA is used the broad range is about 70 percent to about 95 percent by weight. Examples of typical solution in percent by weight, which can be used in this system, are as follows:

| MEA | 40% water 60% |
|---|---|
| DEA | 70% water 30% |
| TEA | 95% water 5% |
| diisopropanolamine | 78% water 22% |

Although generally the amount of water for all alkanolamines lies in the range of about 5 to about 80 percent by weight based on the total weight of the solution (see Caa in formula below) and the solution preferably has the proper viscosity for pumping, the amount of water is determined in the end by molality in the ranges set forth above.

It is preferred that the system be essentially corrosion-free. Otherwise, the advantages effected by subject process will be negated in a commercial application by the loss of production due simply to the down-time caused by corroded apparatus. This can be achieved in a carbon dioxide system, for example, by using the corrosion inhibitors described in the claims of United States patent 3,808,140 or using apparatus made from various titanium alloys, noble metal alloys, or various corrosion resistant stainless or carbon steels, or by using glasslined apparatus. In any case, it is suggested that some anticorrosion system be used in a carbon dioxide system. Note, for example, other corrosion inhibitors described in United States Pat. No. 3,808,140. Corrosion in a hydrogen sulfide system is inhibited by the manner of design and the use of materials of construction similar to those for the carbon dioxide system rather than through the use of corrosion inhibitors in the absorbent solution.

The apparatus used in the process for absorption, stripping and cooling as well as reboilers, filters, piping, turbines, pumps, flash tanks, etc., are of conventional design. A typical absorption column used in the the system can be described as a sieve tray contactor with 15 to 35 seive trays having a tray spacing of 0.6 meter or its equivalent in packing. A typical distillation column used in the system can be described as a sieve tray tower having 15 to 20 actual trays or its equivalent in packing. The still contains in its base, or in an external kettle, a tubular heating element or reboiler (not shown in the drawing) and at the top of and external to the still are condensers and a water separator (not shown in the drawing).

Cooling is typically handled by air cooled or water cooled condensers. In the preferred mode of the subject process, however, the vent gas is used to effect all or part of the cooling, which is obviously advantageous in reducing external energy requirements.

A rather sophisticated formula for determining optimum operating limits within ranges described elsewhere in this specification is as follows:

Operating at a solvent to gas flow ratio of at least $Q/(150\text{-Til})Sl$, but less than $Q/(78\text{-Til})Sl$ where Q is defined by $$Q = \frac{\Delta Hr\ Cag}{Mag} + Sg\ (Tig - Til) + \frac{\Delta H_c Cw}{Mw}$$

and within the range of at least $$\frac{Cag\ Maa}{Mag\ Caa\ (0.52)} \text{ but less than } \frac{Cag\ Maa}{Mag\ Caa\ (0.05)}.$$

In this formula Til concerns the lean solvent that is cooled to a temperature of about 30° C. to about 75° C. and the flow ratio is defined by:

$$Fr = \frac{\frac{\Delta Hr\ Cag}{Mag} + Sg(1 - Cag - Cw)\ (Tig - Til) + (Sag\ Cag + SwCw)\ (Tol - Tig) + \frac{\Delta Hc\ Cw}{Mw}}{(Tol - Til)\ Sl}$$

which can be abbreviated to:

$Fr = Q/(Tol\text{-Til})\ Sl$

The flow ratio can also be expressed in terms of $\Delta L$ as follows:

$Fr = Cag\ Maa/Mag\ \Delta L\ Caa$

The definitions of symbols are as follows:
1. Caa = percent by weight alkanolamine based on the weight of the aqueous alkanolamine solution
2. Cag = weight fraction of acid gas in feed gas based on the total weight of the fed gas
3. Cw = weight fraction of condensable water (water vapor) in feed gas based on the total weight of the feed gas (as converted from total volume of feed gas)
4. Fr = flow ratio, lean solution to feed gas by weight
5. $\Delta$Hr = molar heat of reaction of acid gas and alkanolamine expressed in gram calories/gram moles and based on the lean solution loading and rich solution loading expressed in moles acid gas/moles alkanolamine
6. $\Delta$Hc = molar heat of condensation of water expressed in gram calories/gram mole
7. $\Delta$L = difference between lean solution loading and rich solution loading expressed in moles acid gas/moles alkanolamine.
8. Maa = Molecular weight of alkanolamine.
9. Mag = Molecular weight of acid gas
10. Mw = Molecular weight water (18.00)
11. Sag = Specific heat of acid gas expressed in gram calories/gram ° C
12. Sw = Specific heat of water expressed in gram calories/gram ° C
13. Sg = Specific heat of feed gas expressed in gram calories/gram ° C
14. S = Specific heat of the lean solution expressed in gram calories/gram ° C
15. Tb = Reboiler temperature of lean solution ° C (bottom of still)
16. Tig = Inlet temperature of feed gas, ° C. (absorption zone)
17. Til = Outlet temperature of vent gas ° C. and inlet temperature of lean solution ° C. (absorption zone)
18. Tol = Outlet temperature of rich solution ° C. (absorption zone)

Ranges for certain of the variables can be found throughout the specification and are designated by parenthetical expressions containing the appropriate symbol.

REFERRING TO THE DRAWING:

The feed gas is introduced at line 1 into the absorber 2 at or near the bottom tray, the feed gas absorber inlet temperature (see Tig) being in the range of about 35° C. to about 150° C. and preferably about 95° C. to about 125° C. The feed gas flows upwardly through the absorber to countercurrently meet the aqueous alkanolamine solution referred to as lean solution, i.e., it contains less than about 0.25 mole of acid gas per mole of alkanolamine, which is introduced at or near the top tray of absorber 2 through line 12.

The pressure in absorber 2 can be in the range of about 100 psia to about 1500 psia and is usually in the range of about 350 psia to about 800 psia.

The lean solution enters absorber 2 at a temperature (see Til) in the range of about 30° C. to about 75° C. and is usually about 45° or 50° C.

The feed gas, which has had the bulk of its acid gas absorbed, passes up the absorber column and exits as vent gas through line 3 at a temperature (see Til) in the range of about 30° C. to about 75° C. and is usually about 45° or 50° C. The vent gas (or process gas) may contain up to about 18,000 ppm of acid gas, the objective, of course, being to meet the specification requirements for the process gas, which are sometimes as low as 5 ppm of acid gas. The present process can meet these broad requirements without difficulty.

After the lean solution absorbs all but the small fraction of acid gas referred to above, it is referred to as rich solution, i.e., a mixture of lean solution, absorbed acid gas, additional water picked up from the feed gas, and some impurities. The "rich solution loading", which is the ratio of moles of acid gas to moles of alkanolamine in the rich solution is in the range of about 0.1 to about 1.0 and is usually about 0.2 to about 0.6. The rich solution exits absorber 2 at or near the bottom tray through line 8 at an absorber outlet temperature (Tol) in the range of about 78° to about 150° C. and normally is in the range of about 95° to about 125° C. provided that the rich solution absorber outlet temperature (or absorber bottoms outlet temperature) is no lower than 22° C. less than the bottoms outlet temperature of the lean solvent in stripper 9.

The rich solution absorber outlet temperature, as noted, is derived from the amount of acid gas, the absorption zone inlet temperature of the feed gas, the molality, and the amount of absorption as defined above, and the operator selects these parameters so as to bring this absorber outlet temperature as close to the bottoms outlet temperature of the stripping zone as possible or above it to the stated maximum.

The rich solution then proceeds along line 8 to stripper 9 where its stripping zone inlet temperature is essentially the same ($\pm 5°$ C) as its absorber outlet temperature. The inlet of line 8 is at or near the top tray of stripper 9.

The acid gas and some water are removed from the rich solution in stripper 9 by distillation. The stripper can be operated by using one or more of lower pressure, direct heating, or the introduction of live steam. Direct heating generates steam internally from the water in the rich solution and can be accomplished by passing lean solution (bottoms) through reboilers (not shown) and recycling into the stripper. A mixture of acid gas and a minor proportion of water vapor exit from the top of stripper 9 through line 11. The water can then be removed by condensation and the acid gas recovered by conventional means. All or part of the water may be recycled to the stripper as reflux, the preferred mode being to recycle sufficient water to provide the correct molality for the lean solution as noted hereinafter. It should be noted that the water in the stripper has a variety of origins, i.e., feed gas, aqueous alkanolamine solution, and reflux water.

The stripper can be operated at a pressure ranging from atmospheric to about 50 psia and is normally operated in the range of about 20 psia to about 30 psia and at a lower pressure than the absorber. The lean solution leaves the stripper through line 12 at a stripper bottoms outlet temperature (Tb) in the range of about 100° to about 150° C. and usually about 100° to about 125° C.

The "lean solution loading" is the ratio of moles of acid gas/moles of alkanolamine in the lean solution and can be about 0.05 to about 0.25 and is preferably about 0.12 to about 0.22. The lean solution passes along line 12 into cooling zone 7 where its temperature is reduced to about 30° to about 75° C. and normally about 45° or 50° C. The cooling can be accomplished, in part, by sending all or part of the vent gas through line 6 prior to sending it to conventional recovery apparatus or directly to the process where it is to be utilized. Any of the vent gas which is not to be used for cooling is sent directly through line 4 for recovery or processing as the case may be. External cooling with water or air is normally used in cooling zone 7. The cooled lean solution then continues along line 12 until it enters absorber 2 where the cycle begins again. The temperature of the incoming lean solution is such that the heat of the feed gas, the heat from the exothermic reaction of acid gas and alkanolamine, and the heat of condensation of water will not raise the rich solution to a temperature exceeding the maximum rich solution absorber outlet temperature.

It is suggested that the rich solution be filtered after it leaves absorber 2 and that circulating pumps and/or turbines be used at points along the various lines to maintain the desired circulation rate.

Cooling zone 7 can be in the form of one or two coolers or other conventional cooling means can be used as well as using the vent gas as described above.

In commercial operations there are losses in the system due to amine entrainment and varporization, water entrainment, amine degradation, and spillage. These are conventional problems which do not effect the operation of the overall process and will not be treated here.

A feature of this invention is that one or more flashing zones or flash tanks (not shown) can be used together with or in place of stripper 9 and the term "stripping zone" is defined herein to include this option, which is analogous to a one-stage distillation column, generally operated at low pressure, i.e., a much lower pressure than the absorption zone section of the system. Flashing is a simple and inexpensive way of removing the acid gas from the rich solution.

The invention is illustrated by the following examples:

EXAMPLES 1 to 3

The examples are conducted in accordance with the flow sheet in the drawing and the preferred steps and conditions in the specification.

The absorber is a sieve tray tower contactor having 30 sieve trays and a tray spacing of 0.6 meter.

The still is also a sieve tray tower with 17 trays. External to the base of the still are two reboilers in parallel and external to the top of the still are a condenser, water separator, and pump.

There is a filter and hydraulic turbine in line 8 and in line 12 there are two coolers in series together with a pump. All of the vent gas (process gas) passes through line 4. Line 6 is not used. The coolers are water cooled.

The apparatus is made of carbon steel and stainless steel. Corrosion inhibition is effected by the corrosion inhibitors described in the claims of U.S. Pat. No. 3,808,140.

The alkanolamine used as the absorbent is monoethanolamine (MEA).

The feed gas is a mixture of 20% $N_2$, 61% $H_2$, and 19% $CO_2$ ($\pm$) saturated with water. 1% by weight impurities are also present. The percentages of $N_2$, $H_2$, and $CO_2$ are by volume and based on the total volume of the feed gas.

Other test conditions and results are set forth in the Table.

Table

| | Example 1 | Example 2 | Example 3 |
|---|---|---|---|
| MEA concentration in percent by weight based on the weight of the aqueous solution of MEA | 43.6 | 35.0 | 42.4 |
| Feed gas absorber inlet temperature ° C. | 100 | 108 | 102 |
| Feed gas throughput $m^3h$ (dry) | 157,583 | 157,583 | 161,164 |
| Vent gas absorber outlet temperature ° C | 49 | 44 | 43 |
| Acid gas content of vent gas -ppm | less than 100 | less than 100 | less than 100 |
| Lean solution flowrate into absorber in liters per minute | 10,450 | 10,450 | 9,700 |
| Molality of lean solution entering absorber | 12.6 | 8.8 | 12.0 |
| Lean solution absorber inlet temperature ° C. | 49 | 44 | 43 |
| Rich solution absorber outlet temperature ° C. | 102 | 97 | 106 |
| Absorber pressure psig (average) | 395 | 395 | 395 |
| Rich solution stripper inlet temperature ° C | 102 | 97 | 106 |
| Lean solution stripper bottoms outlet temperature ° C. | 119 | 118 | 118 |
| Stripper reboiler temperature ° C. | 119 | 118 | 118 |
| Stripper overhead temperature ° C. | 97 | 97 | 97 |
| Stripper overhead pressure-psig | 8 | 8 | 8 |
| Stripper reboiler pressure-psig | 12 | 12 | 12 |
| Reboiler heat duty (kilocalories per kilogram mol of $CO_2$ removal) | 37,222 | 38,333 | 32,778 |
| Lean solution loading, moles/moles | 0.16 | 0.15 | 0.15 |
| Rich solution loading, moles/moles | 0.41 | 0.47 | 0.44 |

I claim:

1. A continuous process for acid gas removal comprising the following steps:

a. introducing into an absorption zone a mixture of process gas and acid gas comprising a process gas selected from the group consisting of a hydrocarbon, a mixture of hydrocarbons, synthesis gas, and a mixture of nitrogen and hydrogen, and about 5 to about 60 percent by volume of an acid gas selected from the group consisting of carbon dioxide, hydrogen sulfide, and mixtures of said acid gases, wherein percent by volume is based on the total volume of the mixture of process gas and acid gas introduced into the absorption zone, at an absorption zone inlet temperature for the mixture of process gas and acid gas in the range of about 35° C. to about 150° C.;

(b) counter-currently contacting in the absorption zone the mixture of process gas and acid gas referred to in step (a) with an alkanolamine having 1 to 3 alkanol radicals, each alkanol radical having 2 or 3 carbon atoms, and water, sufficient water being present to provide a molality in the range of about 3 to about 130, the determination of said molality being made on the basis of alkanolamine as solute and water as solvent wherein the pressure in the absorption zone is in the range of about 100 psia to about 1500 psia, the alkanolamine and water are in solution prior to contact and the absorption zone inlet temperature for said solution is in the range of about 30° C. to about 75° C., the acid gas is absorbed into the aqueous alkanolamine solution in an amount of about 0.1 mole to about 1.0 mole of acid gas per mole of alkanolamine, and the amount of acid gas, the absorption zone inlet temperature of the mixture of process gas and acid gas, the molality, and the amount of absorption are selected from the ranges set forth above to provide an absorption zone outlet temperature for the aqueous alkanolamine solution with the acid gas absorbed therein in a range the lowest point of which is no lower than 22° C. less than the bottoms outlet temperature of the stripping zone referred to in step (g) and the highest point of which is about 150° C.;

(c) removing the process gas overhead from the absorption zone;

(d) removing the aqueous alkanolamine solution with the acid gas absorbed therein from the bottom of the absorption zone;

(e) introducing the solution from step (d) into a stripping zone at an inlet temperature essentially the same as the absorption zone outlet temperature for said solution;

(f) separating a mixture of acid gas and a minor proportion of water from the solution referred to in step (e), the separated water being in the form of vapor, and removing said mixture overhead from the stripping zone;

(g) removing the balance of the solution referred to in step (f) from the bottom of the stripping zone at a bottoms outlet temperature in the range of about 100° C. to about 150° C.;

(h) passing the solution from step (g) into a cooling zone wherein the temperature of the solution is reduced to a temperature in the range of about 30° C. to about 75° C.; and (i) recycling the solution of step (h) to the absorption zone.

2. The process defined in claim 1 wherein
(i) the percent by volume of acid gas is about 15 to about 30;
(ii) the absorption zone inlet temperature for the gas mixture is about 95° C. to about 125° C.;
(iii) the pressure in the absorption zone is about 100 psia to about 1500 psia;
(iv) the amount of acid gas absorbed is about 0.2 to about 0.6 mole of acid gas per mol of alkanolamine;
(v) the absorption zone outlet temperature for the solution is in a range, the highest point of which is about 125° C.; and
(vi) the bottoms outlet temperature in the stripping zone is about 110° C. to about 125° C.

3. The process defined in claim 1 wherein the mixture of process gas and acid gas is saturated with water vapor.

4. The process defined in claim 2 wherein the mixture of process gas and acid gas is saturated with water vapor.

5. The process defined in claim 3 wherein the alkanolamine is monoethanolamine or diethanolamine.

6. The process defined in claim 4 wherein the alkanolamine is monoethanolamine or diethanolamine.

7. A process according to claim 1 wherein the equeous alkanolmaine solution contains corrosion inhibitors.

* * * * *